No. 654,331.  
A. SHIELS.  
MILKING MACHINE.  
(Application filed June 23, 1896.)  
Patented July 24, 1900.

(No Model.)  
7 Sheets—Sheet 1.

Witnesses  
H. van Oldenneel  
Otto Munk

Inventor  
Alexander Shiels  
by Reinart R  
Attorneys

No. 654,331. Patented July 24, 1900.
A. SHIELS.
MILKING MACHINE.
(Application filed June 23, 1896.)
(No Model.) 7 Sheets—Sheet 2.

No. 654,331. Patented July 24, 1900.
A. SHIELS.
MILKING MACHINE.
(Application filed June 23, 1896.)
(No Model.) 7 Sheets—Sheet 5.

Witnesses
H. van Oldenneel
Otto Munk

Inventor
Alexander Shiels
by
Attorneys

THE NORRIS PETERS CO., PHOTO-LITHO., WASHINGTON, D. C.

No. 654,331. Patented July 24, 1900.
A. SHIELS.
MILKING MACHINE.
(Application filed June 23, 1896.)

(No Model.) 7 Sheets—Sheet 6.

Witnesses
H. van Olden...
Otto Munk

Inventor
Alexander Shiels
by
Attorneys

No. 654,331. Patented July 24, 1900.
A. SHIELS.
MILKING MACHINE.
(Application filed June 23, 1896.)

(No Model.) 7 Sheets—Sheet 7.

Attest
Walter Donaldson
F. L. Middleton

Inventor
Alexander Shiels
by Richards & Co. Attys

UNITED STATES PATENT OFFICE.

ALEXANDER SHIELS, OF GLASGOW, SCOTLAND.

MILKING-MACHINE.

SPECIFICATION forming part of Letters Patent No. 654,331, dated July 24, 1900.

Application filed June 23, 1896. Serial No. 596,638. (No model.)

*To all whom it may concern:*

Be it known that I, ALEXANDER SHIELS, M. B., C. M., B. Sc., a subject of the Queen of Great Britain, and a resident of the city of Glasgow, Scotland, have invented certain new and useful Improvements in Milking-Machines, of which the following is a specification.

This invention relates to vacuum milking-machines; and it has for its object to improve and simplify their construction.

In my present invention instead of having a large machine for controlling and regulating the vacuum at the teat-cups I employ one or more vacuum-pipes in which by any suitable or available means the vacuum is maintained at a constant power of suction. These pipes pass around the byre or other place in which the cows are to be milked, and to any one of a series of cocks fitted on them I connect a small vacuum regulating and controlling machine of special construction.

In order that my said invention may be properly understood, I have hereunto appended explanatory sheets of drawings, whereon—

Figure 16:
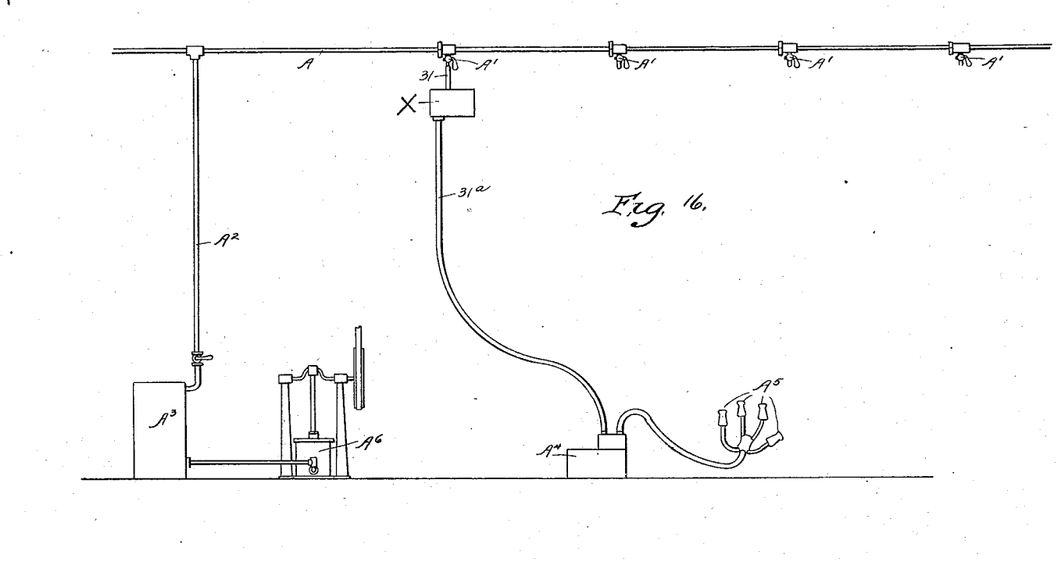
Fig. 16 is a diagram of the system.

In carrying out my present invention I fit in any suitable situation within the byre one or more pipes A, Fig. 16, having cock connections A on them, one for each stall or pair of stalls. The pipe or pipes A are connected by another branch pipe $A^2$, provided with an automatic valve of any well-known and suitable construction for regulating the vacuum to the vacuum-reservoir $A^3$. This valve is so arranged as to keep the vacuum in the byre-pipes at a constant power of suction.

The machine for regulating and controlling the vacuum at the teat-cups is arranged to be coupled in any well-known manner—on the one hand, with any one of the cocks of the byre-pipes, and, on the other hand, with a milk-pail $A^4$ and teat-cups $A^5$.

$A^6$ is a vacuum-pump connected with the reservoir $A^3$. This pump may be operated in any well-known manner.

The machine consists of a vacuum-motor constructed with two cylinders 1 2, as shown at Figs. 1, 2, 3, 5, and 11, consisting of cylindrical pieces inserted into cast bottoms 3, provided with screwed downward extensions 4, whereby they can be bolted to the bed-plate 16. Fitted in each cylinder is a solid piston 6, provided with a ring cup-leather 7 and with a cylindrical upward extension 8 to a pin 9, inserted in which the lower end of the connecting-rod 10 is secured.

17 are guide-arms connected with the extension 8.

Figures 7, 10:
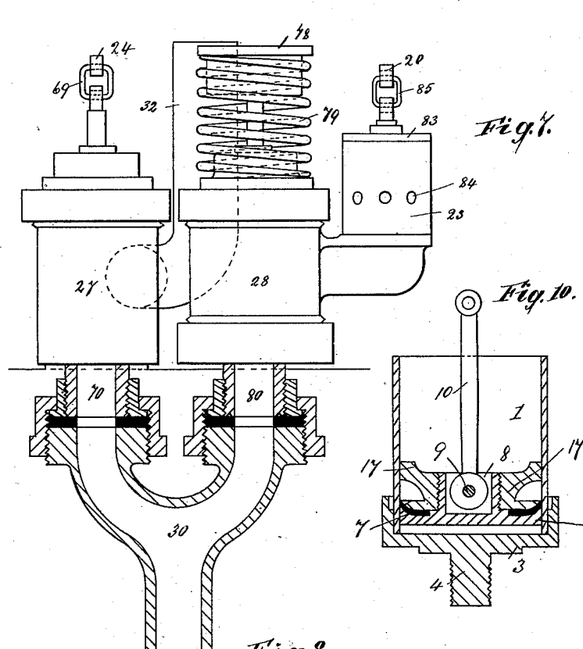
Fig. 7 is a side view of the casings and other parts relating to the pulsating valve and the vacuum-destroying valve.
Figs. 10 and 11 are sectional views, taken at right angles to each other, of the motor-cylinders with pistons.
Figure 8:
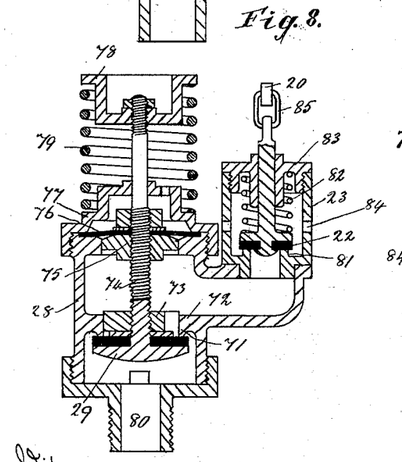
Fig. 8 is a sectional view through the vacuum-destroying valve and the air-admission valve.
Figure 9:
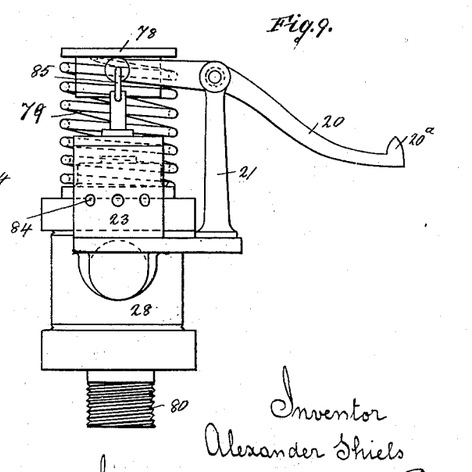
Fig. 9 is a side view of the casings and attached parts relating to the air-admission valve and the vacuum-destroying valve.
Figure 11:
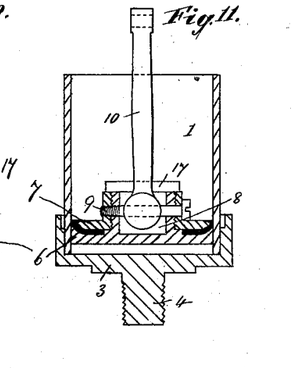

The upper ends of the connecting-rods 10 are pinned to two crank-arms 11 12, fixed to a rocking shaft 13, carried in bearings at the top of small pillars 14 15, secured to the bed-plate 16 of the machine. This shaft 13 is provided with somewhat sector-shaped cams 18 19, one at each end, as shown. The cam 19 is capable of depressing the free end of a lever 20, fulcrumed on the pillar 21, thereby raising its other end and opening an air-admission valve 22, inclosed in a casing 23. (See also Figs. 7, 8, and 9.) The other cam 18 operates in a similar manner a lever 24, fulcrumed on a pillar 25, (see also Figs. 12 to 15,) and opens a pulsating valve 26, inclosed in a casing 27. The air-admission-valve casing 23 is, as shown at Figs. 7 to 9, connected with the casing 28 of a vacuum-destroying valve 29. The constructions of these different valves and their accessory parts will be more fully described hereinafter.

Figures 1, 6:
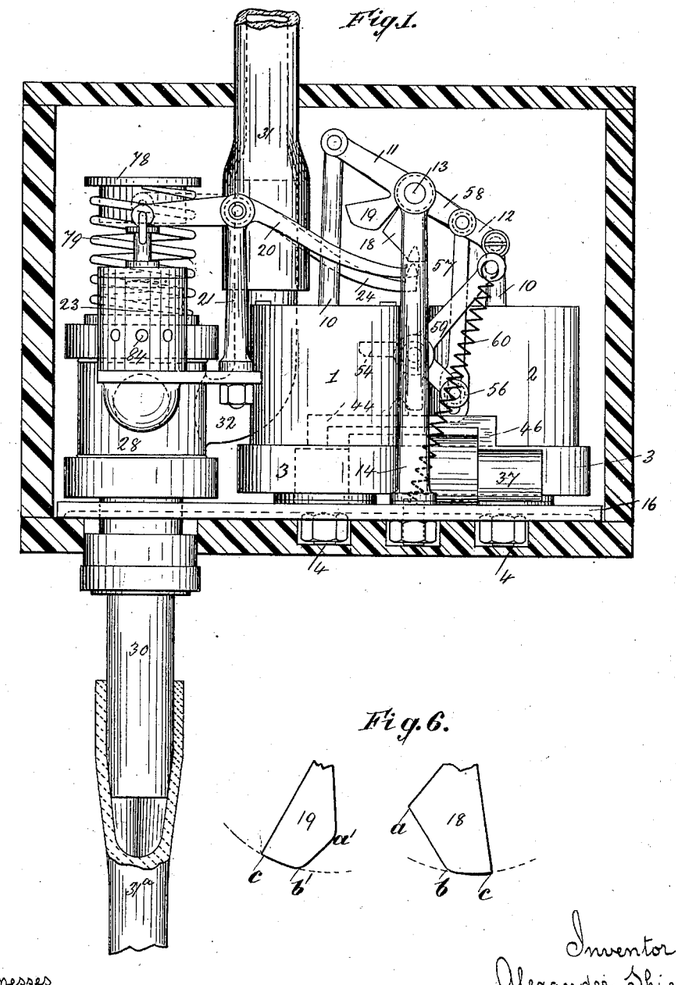
Figure 1 is a side elevation of the machine as it appears fitted in its inclosing casing.
Fig. 6 shows enlarged views of the cams 18 19.
Figure 2:
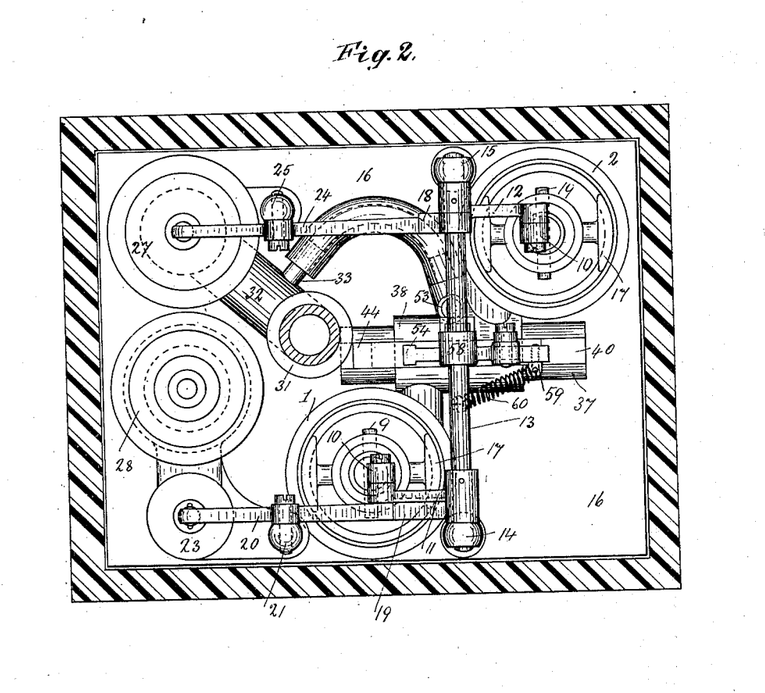
Fig. 2 is a plan of the machine.
Figure 3:
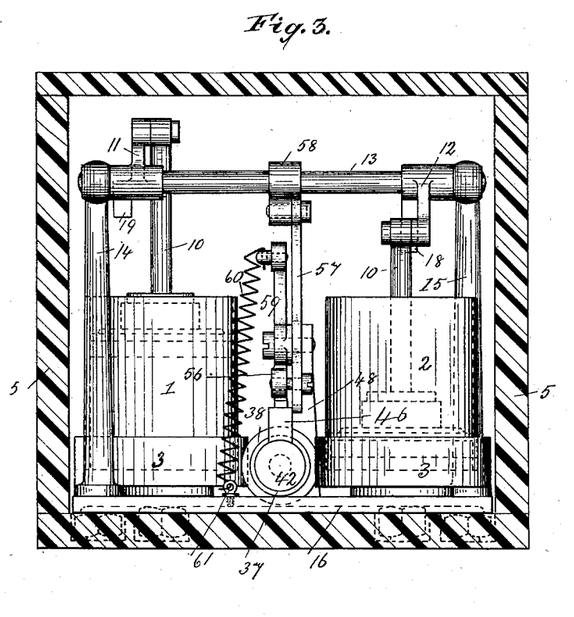
Fig. 3 is an end view of the machine.

The casings 27 and 28 of the pulsating valve and the vacuum-destroying valve are connected together, as shown at Figs. 1 and 7, by a Y-coupling 30, to which a rubber or other pipe 31ª, leading to the teat-cups of the milking-machine, is attached.

Figure 4:
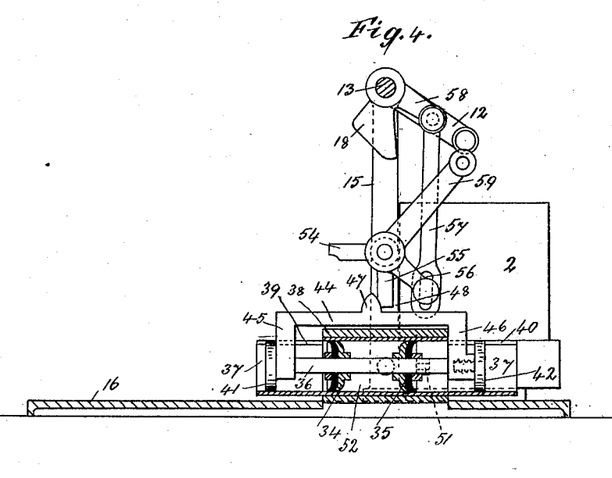
Fig. 4 is a sectional view of the valve 34 35.
Figure 5:
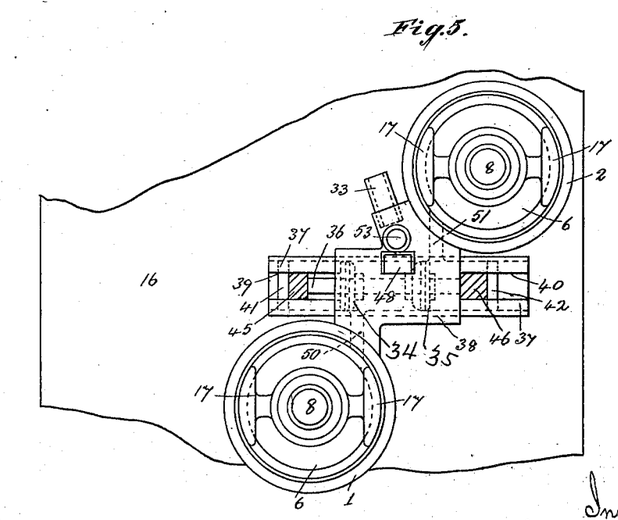
Fig. 5 is a plan of the valve 34 35.

The vacuum from the byre-pipes is carried by a pipe connection 31 direct to the branch 32 of the pulsating-valve casing 27. A small vacuum-pipe 33 leads from the branch 32 to the controlling-valve, which regulates the vacuum in the cylinders of the motor. This valve preferably consists of two cup-leather pistons 34 35, (see Figs. 4 and 5,) fitted on a spindle 36 and inclosed in a tubular casing 37, secured within the casting 38. The ends of the casing are slotted on the upper side, as shown at 39 and 40. A forked lever 44 at the outside of the casing 37 has its downwardly-projecting ends 45 46 passed right through the slots 39 40 and attached to sliding disks 41 42 in the casing. A tooth 47 is made at the center of the forked lever. The dotted lines 50 51, Fig. 5, show the ports leading from the valve-casing to the cylinders, and the dotted circle 52, Fig. 4, indicates the vacuum-port leading from the pipe 33.

53 is a small screw-down valve for opening or closing the branch pipe 33. A small jaw 48 is cast in one with the casting 38, and upon this jaw is mounted a kicker having two arms 54 55, which are capable of striking the tooth 47 of the fork-lever. Made one with this kicker is a short arm 56, which is jointed to a slotted link 57, pinned at its upper end to a crank-arm 58 on the shaft 13, and also a long arm 59, having attached to its upper end a spring 60, which is secured to an eye-pin 61, inserted in the bed-plate 16.

The pulsator-valve, as shown at Figs. 12, 13, 14, and 15, is of very simple construction, merely consisting of the casing 27 with a web 62 cast therein, which web is bored with a hole 63 and is provided with a ring-seat 64 for the valve 26. A guide-nut 65 is screwed on the lower end of the spindle of the valve. At the upper end of the spindle of the valve is a piston 66, having a convex upper surface and a diaphragm 67, held in place by a screw-cap 68. Air is admitted through a hole in the cap 68 to the top of the diaphragm. The piston 66 serves as a guide and also as a support for the diaphragm. The upper end of the spindle of the valve is attached by a link 69 to the lever 24, which latter has a tooth 24ª at its end. As the area of the diaphragm 67 is greater than that of the valve 26, it follows that the valve 26 will normally be held closed by the action of the atmosphere on the diaphragm 67.

70 is a branch leading to the Y-coupling 30.

The vacuum-destroying valve 29 (shown in Figs. 7, 8, and 9) is also of a simple construction. It is similar to the pulsator-valve, except that instead of closing down on its seat it closes up against a ring-seat 71, made on the web 72 of the casing 28.

Figure 12:
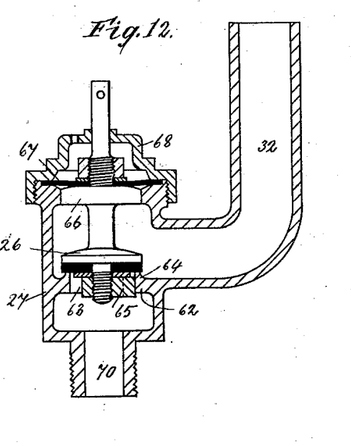
Fig. 12 is a section, Fig. 13 an end view, Fig. 14 a plan, and Fig. 15 a front view, of the pulsator-valve 26.
Figure 13:
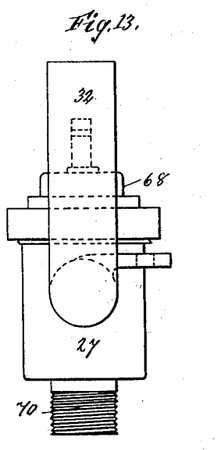
Figure 14:
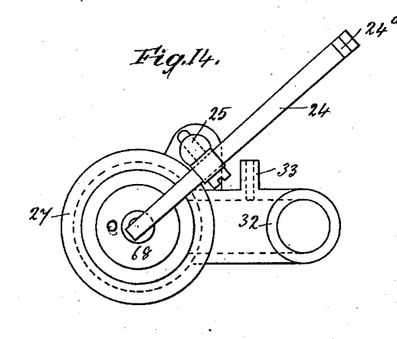
Figure 15:
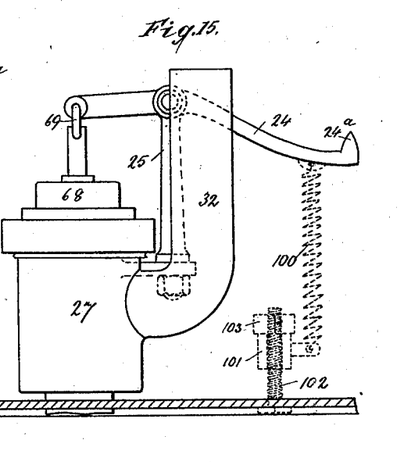

73 is a guide-nut similar to the one 65, Fig. 12.

The valve-spindle 74 is screwed and has on it a guide and supporting piston 75 and a diaphragm 76, open to atmospheric pressure on its upper side. The spindle is extended out through the casing-cover 77 and has fitted on its upper end an adjustable cap 78, which is capable of being screwed up and down on the spindle, so as to regulate the tension of the spring 79.

80 is the branch leading to the coupling-pipe 30. The suction in the pipe 30 acts on the valve 29 and, in conjunction with the action of the air on the diaphragm 76, tends to open it; but the spring 79 is so adjusted by the cap 78 that the valve only remains open so long as the vacuum in the pipe 30 exceeds a certain desired minimum degree.

The air-admission valve 22 is normally held closed against its seat 81 by means of the spiral spring 82, held in place between the back of the valve and the cover 83 of the casing 23. 84 are air-holes made in the casing. The spindle of this valve is connected by a link 85 to the end of the lever 20, which is also provided with a tooth 20ª.

The valves 29 and 22 work in conjunction, as hereinafter described.

The action of the apparatus is as follows: The small machine (represented generally at X in Fig. 16) is first connected by the pipe 31 to a cock on the vacuum-pipe and by the pipe 31ª to the milk-pail and teat-cups, as usual. Then the small screw-down valve 53, Fig. 5, is opened and vacuum admitted from the pipe 33 through the port 52 to the valve-casing 37. Now presuming that the piston of No. 2 cylinder is in the up position and the piston of No. 1 in the down position—i. e., the reverse of what is shown on the drawings—the piston-valve 34 35 would be in a position to admit vacuum from the pipe 33 and port 52 to the cylinder 2. The vacuum acting on the under side of the piston sucks it down and at the same time rocks the shaft 13, thereby causing the cam 18 to depress the tooth 24ª on the end of the lever 24, thereby pulling up the valve 26 against the action of the air on the diaphragm 67 and admitting vacuum to the pipe 30 31ª and the teat-cups. The rocking of the shaft 13, however, at the same time causes the link 57 to be gradually depressed and after moving a short distance (represented by the length of the slot at its lower end) to act on the arm 56 and cause the kicker-arm 55 to strike against the tooth 47 of the fork-lever 44 and knock that lever and the valve-spindle 36, with its valves 34 35, over to the position shown on the drawings at Figs. 4 and 5—i. e., to the position for admitting vacuum from the port 52 to the port 50 and cylinder 1 and for admitting air from the end of the casing 37 through the port 51 to destroy any vacuum in the cylinder 2. The valves 34 35 being in the position shown at Figs. 4 and 5 and the piston of cylinder 1 being now in the up position, as shown in dotted lines at Fig. 3, the vacuum from the port 50 acting on the under side of the piston sucks it down and causes it as a consequence to rock the shaft 13 in an opposite direction to the previous oscillation, thereby causing the cam 18 to gradually release the tooth 24$^a$ and permit the pulsator-valve 26 to close down on its seat. Just after the valve 26 has closed the cam 19 is, by the continued movement of the shaft 13, caused to gradually depress the tooth 20$^a$ of the lever 20, thereby opening the air-admission valve 22 and admitting air to the valve 29, which should there be more than the desired minimum of vacuum in the pipe 30 will be open, so that air at once rushes in and destroys the vacuum in the pipe 30 until it is reduced down to the desired minimum limit, when the valve 29 will automatically close by the action of the spring 79. This reverse movement of the shaft 13 causes the link 57 to again pull up, after a certain time, the arm 56 and to eventually cause the striker 54 to strike the tooth 47 of the fork 44 and knock back the valve 34 35 to its original position—i. e., to a position to again admit vacuum to the cylinder 2 and to admit air through the slot 39 to destroy the vacuum in cylinder 1. A sudden knock each time is given to the fork 44 by the action of the spring 60. Whenever the long arm 59 of the kicker passes the center of the pillar 14 on either one side or other, which will only be when the striking-arms are near the tooth 47, the spring 60 exerts its force suddenly and gives a rapid movement to the kicker and causes the latter to strike the tooth 47 with sufficient force to drive the valve 34 35 to one side or other of its casing. The length of the slot in the link 57 is so arranged that the piston, which is for the time being descending, always has sufficient stroke to be effective before the valve 34 35 is shifted. The cams 18 19 are of a peculiar shape, as shown at Fig. 6. The cam 18 tapers from the point $a$ to the point $b$, from which point to the point $c$ it is arched. This formation of the cam insures that the tooth 24$^a$ and lever 24 will be gradually depressed while the cam is traveling from the point $a$ to the point $b$ and to be held depressed while the cam is traveling from $b$ to $c$. This peculiar action causes the pulsator-valve 26 to gradually open and then to remain fully open for a short time equal to the period taken by the cam in traveling from $b$ to $c$. At the reverse movement of the shaft 13 the action is reversed and the pulsator is kept fully open during the time the cam is traveling back from $c$ to $b$ and then to gradually close during the period taken to travel from $b$ to $a$. The cam 19 is of a similar shape, except that the incline from $a'$ to $b'$ is sharper. This cam causes the air-admission valve to be opened rapidly and then retained open for a short time, thereafter at the reverse movement to remain open for a short time and then rapidly close. The one cam only comes into action just after the other one has ceased to act, so that the air-admission valve 22 is only opened when the pulsator-valve is closed. If desired, an adjustable spring 100 (shown dotted in Fig. 15) can be attached to the lever 24, so as to open the valve 26 should the vacuum in the pipe 70 fall below the desired minimum, thus acting for the time being as a "by-pass valve." This spring 100 is attached at its lower end to a sleeve 101, fitted loosely on a screw-stud 102. The tension of the spring can be regulated by means of a screw-nut 103.

The pulsating action of the machine is essentially the same as that of the machine described in my prior United States Patents Nos. 513,624 and 556,217, on which this invention is an improvement.

The structural details of the invention can be modified or altered without departing from the principle of the invention.

Having now fully described my invention, what I claim, and desire to secure by Letters Patent, is—

1. In a pulsating vacuum milking-machine, the combination with means for creating a vacuum of a vacuum-motor for actuating the machine, consisting of the two cylinders, the pistons therein, the piston-rods extending therefrom, the rocking shaft, the cranks carried by the shaft and connected with the piston-rods, a piston-valve with its casing adapted to admit vacuum to the cylinders alternately and connections between the said valve and the oscillating shaft for operating the valve, substantially as described.

2. In a pulsating vacuum milking-machine, the combination with means for creating a vacuum of a vacuum-motor for actuating the machine consisting of the two cylinders, the pistons therein, the piston-rods extending therefrom, the rocking shaft, the cranks carried by the shaft and connected to the piston-rods, a piston-valve with its casing adapted to admit vacuum to the cylinders alternately, and connections between the said valve and the oscillating shaft for operating the valve, said connections including a fork connected to the valve, and a kicker between the same and the oscillating shaft, substantially as described.

3. In a pulsating vacuum milking-machine, the combination with means for creating a vacuum of a vacuum-motor for actuating the machine, consisting of the two cylinders the pistons therein, the piston-rods extending therefrom, the rocking shaft, the cranks carried by the shaft and connected to the piston-rods, a piston-valve with its casing adapted to admit vacuum to the cylinders alternately, and connections between the said valve and the oscillating shaft for operating the valve, said connections including a fork connected to the valve and a kicker, operated from the oscillating shaft and having two arms arranged to alternately strike a tooth on the fork, substantially as described.

4. In a pulsating vacuum milking-machine the combination of a pulsating device, means for creating a vacuum, a vacuum-pipe connecting the same with the pulsating device, a vacuum-motor also connected with the vacuum-pipe, said motor comprising the two cylinders with their pistons, a piston-valve for alternately admitting vacuum to each of the cylinders, a fork connected with the valve for operating the same, the rocking shaft, connections between the same and the pistons of the cylinders, the connections between the rock-shaft and the pulsating device, and a kicker operated from the rocking shaft and contacting with the fork for operating the same, substantially as described.

5. In combination in a pulsating vacuum milking-machine, a pulsating device, means for creating a vacuum, a vacuum-pipe connecting the same with the pulsating device, a vacuum-motor also connected with the vacuum-pipe, said motor comprising the two cylinders with their pistons, a piston-valve for alternately admitting vacuum to each of the cylinders, a fork connected with the valve for operating the same, said fork having a tooth, the rocking shaft, connections between the same and pistons of the cylinders, the connection between the rock-shaft and the pulsating device, and a kicker operated from the rocking shaft, said kicker having two arms arranged to alternately strike the tooth on the fork, substantially as described.

6. In combination in a pulsating vacuum milking-machine, a pulsating device, means for creating a vacuum, a vacuum-pipe connecting the same with the pulsating device, a vacuum-motor also connected with the vacuum-pipe, said motor comprising the two cylinders with their pistons, a double piston-valve for alternately admitting vacuum to each of the cylinders, a tubular casing for said valve slotted at each end, a fork having ends projecting through the slots and acting on the valve and connections from the pistons of the cylinders to the pulsating device and to the fork for operating the same, substantially as described.

7. In combination in a pulsating vacuum milking-machine, a pulsating device, means for creating a vacuum, a vacuum-pipe connecting the same with the pulsating device, a vacuum-motor also connected with the supply-pipe, said motor comprising the two cylinders with their pistons, a piston-valve for alternately admitting vacuum to each of the cylinders, a fork connected with the valve for operating the same, said fork having a tooth, the rocking shaft, connections between the same and the pistons of the cylinders, the connections between the rock-shaft and the pulsating device, and a kicker operated from the rocking shaft, said kicker having two arms arranged to alternately strike the tooth on the fork with means for giving a sudden action to the kicker, substantially as described.

8. In combination in a pulsating vacuum milking-machine, a pulsating device, means for creating a vacuum, a vacuum-pipe connecting the same with the pulsating device, a vacuum-motor also connected with the vacuum-pipe, said motor comprising the two cylinders with their pistons, a piston-valve for alternately admitting vacuum to each of the cylinders, a fork connected with the valve for operating the same, said fork having a tooth, the rocking shaft, connections between the same and the pistons of the cylinders, the connection between the rock-shaft and the pulsating device, and a kicker operated from the rocking shaft, said kicker having two arms arranged to alternately strike the tooth on the fork, with means for giving a sudden action to the kicker comprising a lever connected to the kicker and a spring attached to the lever, substantially as described.

9. In combination in a pulsating vacuum milking-machine, a pulsating device, means for creating a vacuum, a vacuum-pipe connecting the same with the pulsating device, a vacuum-motor also connected with the vacuum-pipe, said motor comprising the two cylinders with their pistons, a piston-valve for alternately admitting vacuum to each of the cylinders, a fork connected with the valve for operating the same, said fork having a tooth, the rocking shaft, connections between the same and the pistons of the cylinders, the connection between the rock-shaft and the pulsating device, and a two-armed kicker with means for operating the same from the rock-shaft comprising a slotted link connected to the kicker and a crank on the oscillating shaft to which the link is connected, substantially as described.

10. In combination in a pulsating milking-machine the pulsating valve, means for creating a vacuum, the vacuum-pipe connecting the same with the pulsating valve, a vacuum-motor also connected to the vacuum-pipe, connections between the motor and the pulsating valve for opening the same, and the diaphragm connected with the pulsating valve, said diaphragm being exposed to the atmosphere to close the valve automatically, substantially as described.

11. In combination in a pulsating milking-machine, the pulsating valve, means for creating a vacuum, the vacuum-pipe connecting the same with the pulsating valve, a vacuum-motor also connected to the vacuum-pipe, connections between the motor and the pulsating valve for opening the same consisting of a rock-shaft, connections between the same and the motor, a cam on the rock-shaft and a lever connected with the pulsating valve and contacting with the cam, and the diaphragm connected with the pulsating valve exposed to the atmosphere and adapted to close the same, substantially as described.

12. In combination in a milking-machine, the vacuum-motor with a vacuum-supply connected therewith for operating the motor when the vacuum-pressure is let on, the rock-shaft operated by the motor, the air-admission valve normally held closed, a spring for holding the valve normally closed, a lever attached to the valve and means operated by the rock-shaft for opening the valve at certain times, substantially as described.

13. In combination in a milking-machine, the vacuum-motor, with a vacuum-supply connected therewith for operating the motor when the vacuum-pressure is let on, the rock-shaft operated by the motor, the air-admission valve, a spring for normally holding the air-admission valve closed, a lever attached to the valve and a cam fitted on the rock-shaft for operating the lever and opening the valve at certain times, substantially as described.

14. In combination in a milking-machine, the vacuum-motor, with a vacuum-supply connected therewith for operating the motor when the vacuum-pressure is let on, the rock-shaft operated by the motor, the vacuum-destroying valve, the air-admission valve located at the side thereof, the lever attached to the air-admission valve, and the cam on the shaft for operating the lever and opening the air-admission valve at certain times, substantially as described.

15. The vacuum-destroying valve consisting of the valve, the valve-spindle, the piston on the spindle, the diaphragm exposed on its outer side to the air, a casing for the valve and diaphragm, a screwed cap and a spring mounted on top of the casing and adjustable by means of said screwed cap fitted on the end of the valve-spindle, substantially as described.

16. In combination, the casing 27 with suitable pipe connections thereto, the valve 26 in the casing, the piston 66 on the valve-spindle within the casing, the diaphragm 67 on the spindle, the lever 24 connected with the valve-spindle, means for operating the lever and an adjustable spring 100 acting on the lever 24 substantially as and for the purpose set forth.

17. In combination in a vacuum pulsating machine, a vacuum-pump, a pulsating apparatus, a vacuum-motor, connections between the motor and pulsating apparatus for controlling the latter positively and conduits from both the vacuum-motor and the pulsating apparatus to the vacuum-pump, substantially as described.

Signed at Glasgow, Scotland, this 8th day of June, A. D. 1896.

ALEXANDER SHIELS.

Witnesses:
H. D. FITZPATRICK,
WILLIAM GALL.